(12) United States Patent
Rogers et al.

(10) Patent No.: US 6,752,733 B2
(45) Date of Patent: Jun. 22, 2004

(54) INTERNAL COMBUSTION ENGINE EFFICIENCY UNIT

(76) Inventors: William Douglas Rogers, P.O. Box 157, Bentley, LA (US) 71407; Richard Douglas Rogers, P.O. Box 157, Bentley, LA (US) 71407

( * ) Notice: Subject to any disclaimer, the term of this patent is extended or adjusted under 35 U.S.C. 154(b) by 0 days.

(21) Appl. No.: 10/305,739

(22) Filed: Nov. 27, 2002

(65) Prior Publication Data

US 2003/0139248 A1 Jul. 24, 2003

Related U.S. Application Data

(63) Continuation-in-part of application No. 09/622,607, filed as application No. PCT/US98/20711 on Oct. 2, 1998, now abandoned.
(60) Provisional application No. 60/075,233, filed on Feb. 19, 1998, and provisional application No. 60/333,896, filed on Nov. 28, 2001.

(51) Int. Cl.[7] .............................................. F16H 3/72
(52) U.S. Cl. ........................................................ 475/9
(58) Field of Search ................................. 475/221, 225, 475/9

(56) References Cited

U.S. PATENT DOCUMENTS

| | | | | |
|---|---|---|---|---|
| 1,720,018 A | * | 7/1929 | Tubbs | 475/6 |
| 2,196,368 A | * | 4/1940 | Thomson | 475/6 |
| 3,340,748 A | * | 9/1967 | Young | 74/661 |
| 5,275,248 A | * | 1/1994 | Finch et al. | 180/65.6 |
| 6,165,094 A | * | 12/2000 | Williams | 475/6 |

* cited by examiner

Primary Examiner—Dirk Wright
(74) Attorney, Agent, or Firm—Phelps Dunbar, L.L.P.

(57) ABSTRACT

The Internal Combustion Engine Efficiency Unit ("ICEEU") is a device that improves the fuel efficiency of vehicles powered by internal combustion engines, producing low-emission vehicles. It accomplishes this by replacing a single larger engine with two smaller engines, connected together via the ICEEU to produce a single rotary output that powers the vehicle. Both engines are used together when power is needed, but one engine can be shut down when the vehicle is cruising and needs less power to simply maintain its forward momentum. The ICEEU effectively removes the second engine completely from the power train when it is unneeded, so that it does not produce any drag, and also allows the second engine to reenter the power train as needed at any RPM or torque. The ICEEU comprises an open differential and two planetary gear sets to provide the phase shifting ratio that allows for a pair of internal combustion engines to be integrated and separated smoothly throughout operation.

41 Claims, 1 Drawing Sheet

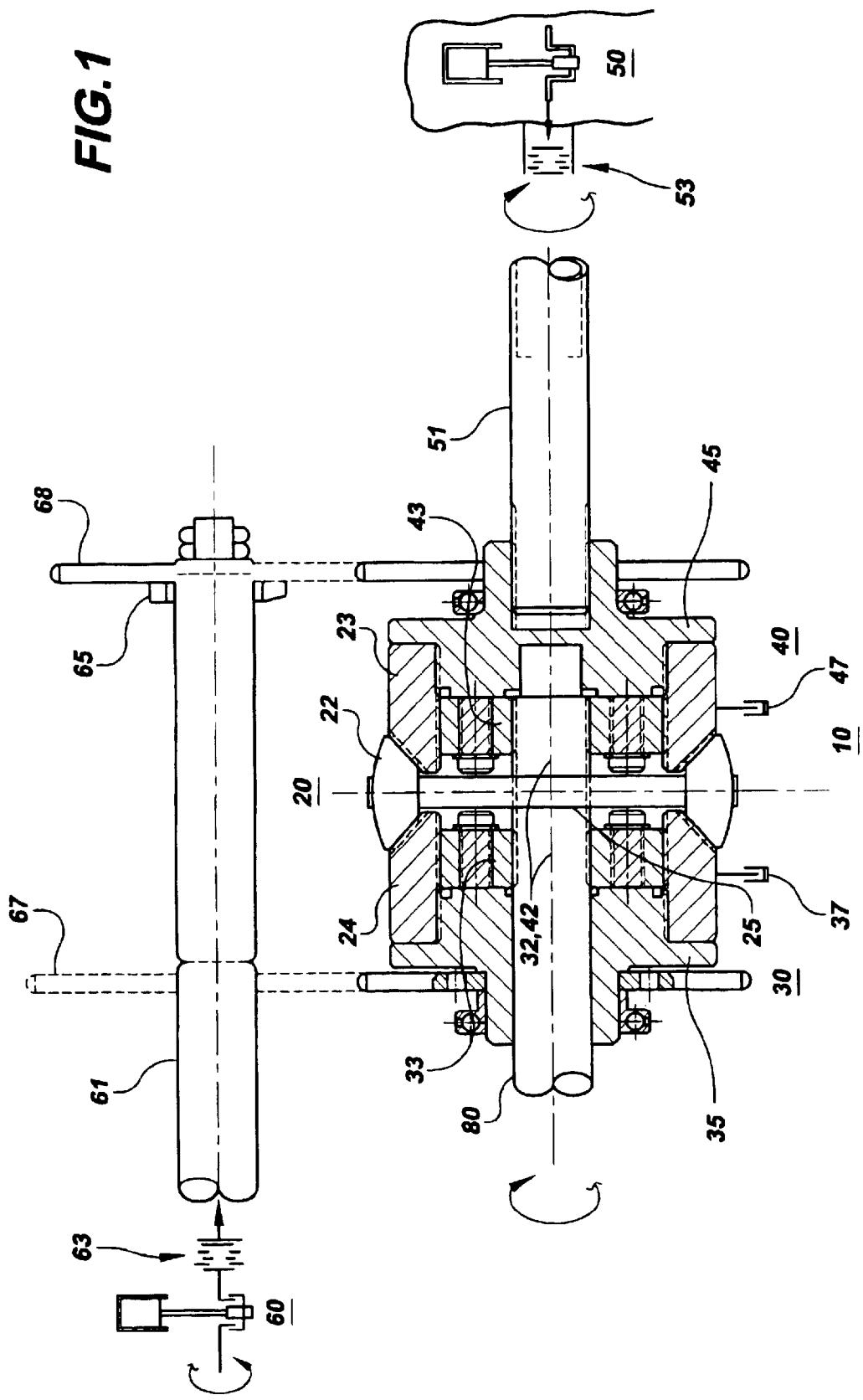

INTERNAL COMBUSTION ENGINE EFFICIENCY UNIT

This application claims benefit of 60/333,896 Nov. 28, 2001 and a CIP of Ser. No. 09/622,607, Dec. 28, 2000 ABN which is a 371 of PCT/US98/20711 Oct. 2, 1998.

BACKGROUND OF THE INVENTION

The internal combustion engine is the primary power source for motorized vehicles throughout the world today. It is a well known and long used technology, and has become favored because it provides vehicles with both substantial power and good range, using a readily available fuel. Unfortunately, there are drawbacks to the internal combustion engine ("ICE"). The primary drawback of the ICE is pollution, since the combustion of petroleum-based fuels causes the emission of pollutants into the atmosphere. More recently, as fossil fuels have become more difficult to obtain and their costs have increased, concerns have also arisen regarding the availability of fuel (and thus the continued viability of ICEs) in the long term and the costs of operating ICEs in the short term. As a result, fuel efficiency in vehicles has become a significant issue, as demonstrated by both government-mandated efficiency guidelines and consumer-driven marketplace dynamics (as consumer demand has caused automobile manufacturers to stress the fuel efficiency of their vehicles in marketing). Automobile manufacturers have responded by constantly tweaking their internal combustion engines, attempting to find ways to maximize the gas milage of their vehicles to gain any sort of competitive advantage in this crucial area.

Since the basic design of the internal combustion engine is so well known and widely understood, most of the engineering design work attempting to improve fuel efficiency involves improvements to the peripheral elements of the ICE cycle, specifically the injection and compression elements. Automobile manufacturers have also worked with fuel producers to create better fuels, designed to burn both cleaner and more efficiently. These advances have significantly improved the fuel efficiency of modern vehicles, but concerns still remain. In an attempt to progress further, manufacturers have, at the prompting of government, begun exploring more radical options that have led them away from ICEs completely. Electric cars and hybrid vehicles represent the current trend for developing fuel efficient, clean, environmentally-friendly vehicles.

Unfortunately, these alternatives have practical problems of their own, which may prevent them from ever effectively replacing ICEs. Electric (battery powered) cars, for example, typically lack power/torque, such that they are ineffective for larger vehicles or for vehicles that pull significant weight (as cargo trucks, by way of example) and do not have an adequate range for anything more than short commutes. Hybrid vehicles are even more experimental at this point, and often rely upon unproven technology like hydrogen fuel cells. These sorts of hybrid vehicles have encountered many significant fuel-related setbacks that may prevent them from ever become practical, real-world vehicles.

The present invention of the Internal Combustion Engine Efficiency Unit ("ICEEU") takes a different tack. It provides a radically different approach to improving the fuel efficiency of internal combustion engines, so that vehicles can still enjoy the benefits of ICEs while gaining significant fuel savings by reconfiguring the specific manner in which their ICEs operate. This is accomplished using a technique which has heretofore been unavailable for internal combustion engines. Specifically, the ICEEU uses multiple (typically two) smaller engines in place of the single large engine that typically powers a motorized vehicle. The two smaller engines feed into the ICEEU, which produces a single rotational output from both engines to drive the vehicle (in the same manner that the vehicle would be driven by the single engine that has been replaced). Smaller ICEs are innately more fuel efficient, and the ICEEU allows one of the two engines to idle, cease operation, and/or resume operation while the vehicle is being driven, such that the vehicle can utilize both engines in tandem when power is needed (during acceleration for instance), but can run on only one engine (during cruising for instance) when much less power is needed to maintain the vehicle's constant speed.

The primary benefit of the ICEEU is that it basically customizes the vehicle's engine as a function of time, so that it provides the appropriate size of engine for the specific circumstances (instead of the current situation with ICEs, in which the engine size for a vehicle is selected one time at purchase to fit all circumstances, even though it may not be appropriate/efficient for much of the operation life of the vehicle). In other words, a vehicle's weight-to-horsepower ratio can be optimized at all times, regardless of the vehicle's speed, acceleration, or cargo weight, to best accomplish the goals at hand at the particular moment. This fact results in improved fuel efficiency. One way to increase fuel efficiency would be to have one engine run in its most efficient range of operation for basically its entire run cycle, while having the other engine provide additional power as needed. More typically, however, one ICE would be completely shut down and disconnected from the power train in circumstances when the additional power/torque is not needed, so that the pistons are not acting as a drag on the system, and the vehicle would then essentially behave as if it were driven by a single, smaller ICE (which is more fuel efficient).

In essence, the ICEEU would provide the vehicle with the power of a large engine when that power was needed (and the vehicle would act as if it had a single, large engine in those circumstances), but would provide the vehicle with the fuel efficiency of a smaller engine whenever there is no need for more power than a single, smaller engine produces (such that the vehicle would act as if it had a single, smaller engine in those circumstances). So by way of example, replacing a V-8 ICE with two 4 cylinder engines connected via the ICEEU would produce a vehicle that would act as an 8 cylinder engine in circumstances when power is needed (for instance, when accelerating quickly or when pulling a heavy load), but would act as a 4 cylinder engine in other circumstances (for instance, when cruising speed has been reached, and the vehicle is merely maintaining its forward momentum on the highway). In the dynamic situation between these two extremes, the vehicle would be able to use some portion of the second smaller engine's power, as needed.

The present invention of the ICEEU allows engines running at different speeds to share the same load, and to enter and leave the power train as needed at any RPM or torque. It optimizes both the engines and the transmission of the vehicle so that a pair of engines can integrate and separate smoothly throughout operation (regardless of RPM or torque). Furthermore, the ICEEU allows internal combustion engines to be used in conjunction with other types of motors in the same manner (i.e. with the alternative motor replacing one of the smaller ICEs), so that it may be used to develop a hybrid vehicle. Regardless of the types of motors being integrated, the most significant point about the ICEEU is that it allows for the use of smaller, more efficient internal combustion engines, while maintaining high-end power availability, so that the vehicle's weight-to-horsepower ratio remains appropriate at all times in the vehicle's life.

SUMMARY OF THE INVENTION

At its heart, the present invention of the Internal Combustion Engine Efficiency Unit ("ICEEU") is an infinitely variable transmission device that features phase shifting as a means for translating two rotational inputs into a single rotational output. Basically, the ICEEU serves the functional purpose of synchronizing torque without synchronizing either rotational speed (RPMs) or horsepower. The ICEEU device could have several practical applications. For instance, it could be used to power a winch pulling fibreoptic cable, with the phase shifting nature of the device being exploited to allow cable to advance at a constant speed under a constant pull force. Or, it could be used to avoid the problem of having brushes weld to the armature of an electric motor, which is typically encountered when starting large DC motors from static position under extreme loads, by controlling motor speed increases using the dynamic counterbalancing effect of phase shifting to avoid the chance of flashover (by rotating one input clockwise and the other counterclockwise at the same speed to produce an infinite ratio, effectively producing no rotation in the output shaft, but allowing precise control over the output shaft rotation by slowing either motor, setting up an extreme ratio).

The primary use for the ICEEU, however, is to allow two separate internal combustion engines to work together as a single motivating force for a vehicle, optimizing both the engines and the transmission of the vehicle so that the pair of ICEs can integrate and separate smoothly at any RPM or torque. The ICEEU allows either of the engines to idle, cease operation, and/or resume operation, so that one of the vehicle's engines may be taken in and out of the vehicle's power train as needed. When one of the two engines is not in operation, it has no negative effect on the other engine and is not a source of friction or drag, which would reduce the efficiency of the power train. Thus, the ICEEU effectively allows a vehicle to act as if it has a larger engine when power is needed (by utilizing both engines as input power sources within the power train) and as if it has a smaller engine when there is no such need for power beyond the capabilities of a single smaller engine (by utilizing only one of its two smaller engines as an input power source for the power train of the vehicle). This effect results in a more fuel efficient, low-emission vehicle, which still has all of the advantages of internal combustion engines.

In basic form, the ICEEU comprises an open differential and two planetary gear sets, and each of the planetary gear sets connects to the open differential in a like manner (forming a mirror image). Typically, one planetary gear set is located on each side of the open differential. In the preferred embodiment, the open differential comprises an internal carrier, two side bevel gears, and planet (spider) bevel gears. Each planetary gear set comprises a sun gear, a plurality of planet gears and a planetary carrier (collectively forming a planetary array), and an annular gear. The appropriate side bevel gear on each side of the open differential rigidly connects to the annular gear for the planetary gear set located on that side of the open differential. The internal carrier for the open differential rigidly connects to the sun gears in both planetary gear sets and to the output shaft. The planetary array (specifically, the planetary carrier) for each planetary gear set connects to an input shaft from an ICE. In this way, the ICEEU connects two internal combustion engines together to produce a single rotational output, transmitting drive power for the vehicle.

To function most effectively as an engine efficiency unit, optional elements may be added to the ICEEU. For example, brakes may be added, so that elements of the planetary gear sets may be stopped, providing another rotational input that can alter the manner in which the ICEEU translates the two rotational inputs into a single rotational output. Clutch mechanisms may also be added to improve the device's operation. For example, a one-way clutch may be used on one of the input shafts so that the speed of the engine attached to that shaft may be regulated with respect to the speed of the other engine (i.e. so that one input shaft is restricted so that it cannot rotate faster than the other input shaft). On the other hand, friction clutches could be used to allow each engine to easily engage and disengage from the power train. Also, there are several different means and locations at which the engines could be attached to the ICEEU. All of these factors will be discussed in greater detail below, when describing the preferred embodiment.

It is an object of the ICEEU to increase the fuel efficiency of internal combustion engines. It is another object of this invention to allow the weight-to-horsepower ratio for a vehicle to be customized depending upon the specific circumstances, so that it is appropriate regardless of the vehicle's speed, acceleration, or cargo weight. It is still another object of this invention to integrate and separate two engines smoothly throughout the operation of a vehicle as needed, in order to optimize the performance characteristics of the vehicle. It is yet another object of this invention to allow two engines running at different speeds to share the same load. It is yet another object of this invention to allow the engines of a vehicle to enter and leave the power train as needed at any RPM or torque. These and other objects will be readily apparent to those skilled in the art field.

BRIEF DESCRIPTION OF THE DRAWINGS

Reference will be made to the drawing, where like parts are designated by like numerals and wherein:

FIG. 1 is a cut-away side view of the preferred embodiment of the ICEEU, arranged so that two engines may be positioned front and rear to serve as input power sources.

DETAILED DESCRIPTION OF THE PREFERRED EMBODIMENT

Referring now to the drawing in more detail, the preferred embodiment of the ICEEU is shown in FIG. 1 and is generally designated by the numeral 10.

The ICEEU 10 most basically comprises an infinitely variable transmission device configured to provide phase shifting translation of two rotational inputs into a single rotational output. More specifically, the ICEEU 10 comprises an open differential 20 and two planetary gear sets 30 and 40, with each of the planetary gear sets 30, 40 connecting to the open differential 20 in a like manner. Typically, the planetary gear sets 30, 40 are identical, and one of the planetary gear sets 30, 40 is located on each side of the open differential 20, forming a reciprocal, mirror-image device that is structured to be balanced on either side of the open differential 20.

There are several types of open differentials, including limited slip differentials, which are well known to persons skilled in the art field and which would serve equally well in the ICEEU 10 device. These include spur gear, bevel gear, and planetary gear types of open differentials. In basic form, an open differential comprises a differential carrier, some planet (or spider) gears, and two output gears, which typically connect to shafts. The planet gears generally are mounted on stubshafts, are fixed to the differential carrier, and orbit the output shaft axis at the same speed as the differential carrier. The planet gears (also known as spider gears) mesh with the output gears to provide the standard differential action.

The planetary or epicyclic gear train gets its name from the resemblance it bears to our solar system. A planetary gear set always includes a sun gear located in the center of the planetary gear set, one or more planet gears orbiting the sub gear, and a planetary carrier or arm that links the planet gears and holds them in place. Often, it also includes an annular gear that encompasses the whole. A planetary gear set has two degrees of freedom, meaning that the motion of each element of the mechanism is not defined unless the motion of two of its elements is specified. The important feature of planetary gear sets for the operation of the ICEEU 10 is that the output is always the function of two inputs. During operation, the inputs sometimes operate as outputs, and the outputs sometimes operate as inputs, as in the case of an overrunning condition (such as engine braking—in such cases there may be torque reversals within the system without changes in direction of rotation).

By connecting the two variable outputs of an open differential (the two output gears) one to each of the planetary gear sets and using the open differential carrier as a second input to each planetary gear set, the ICEEU 10 produces a variable ratio effect that can accomplish phase shifting. Phase shifting is the ability of the planetary gear sets of the ICEEU 10 to operate concurrently and cooperatively in conjunction with the open differential to balance horsepower, which is a function of both speed and torque. This ability allows the system of the ICEEU 10 to internally hesitate, stop, reverse, and create a source of motion, such as is introduced by the planet gear of the planetary gear set when the carrier revolves faster or slower than an axle sun gear, planetary carrier, etc. This has the effect of varying the number of teeth in the sun or annular gears, and can affect the speed (ratio), torque, and internal direction of motion. This amounts to an infinitely variable (in torque and speed) transmission that balances both speed and torque (horsepower) appropriately.

In the preferred embodiment, the open differential 20 comprises an internal carrier 25, two side bevel gears 23 (which are the output gears), and planet (spider) bevel gears 22. The planet bevel gears 22 are held together and in place with a shaft, which connects them to the internal carrier 25. Thus, when the internal carrier 25 rotates, the shaft of the planet bevel gears 22 will also rotate. Each planetary gear set 30, 40 comprises a sun gear 32, 42, a plurality of planet gears 33, 43 and a planetary carrier 35, 45 (collectively forming a planetary array), and an annular gear 23, 33. In the preferred embodiment, the appropriate side bevel gear on each side of the open differential 20 rigidly connects to the annular gear for the planetary gear set 30, 40 located on that side of the open differential 20. Thus, in this preferred embodiment, a single element, termed the annular side bevel gear 23, 33, with two gear faces, has replaced both the side bevel gear and the annular gear for each planetary gear set 30, 40. Furthermore, in the preferred embodiment, the internal carrier 25 for the open differential 20 rigidly connects to the sun gears 32, 42 in both planetary gear sets 30, 40 and to the output shaft 80. The planetary array, specifically, the planetary carrier 35, 45, for each planetary gear set 30, 40 connects to an input shaft 51, 61 from an ICE 50, 60. In this way, the ICEEU 10 connects two internal combustion engines 50, 60 together to produce a single rotational output 80, transmitting drive power for the vehicle.

More specifically, the preferred embodiment connects two internal combustion engines 50 and 60 in a linear arrangement so that one engine is located on each side of the ICEEU 10. Other arrangements exist and would be equally effective with only minor variation in the manner of connection, but the preferred embodiment utilizes this linear arrangement since it is most effective for cargo trucks based upon their cab design. This preferred embodiment is comprised of an open differential 20 and two planetary gear sets 30 and 40. On one side of the open differential 20, the side bevel gear of the open differential 20 rigidly attaches to the annular gear of the planetary gear set 40, forming the annular side bevel gear 23. This gear has two faces, so that it can mesh with both the planet bevel gear 22 of the open differential 20 and the planet gears 43 of the planetary gear set 40, simultaneously serving both functions. The annular side bevel gear 23 encloses the planetary gear set 40.

The internal open differential carrier 25 rigidly attaches to the sun gear 42 of the planetary gear set 40. The sun gear 42 and the annular side bevel gear 23 are both contacted (with intermeshing teeth) by one or more planet gears 43, which are located between the sun gear 42 and the annular side bevel gear 23. Typically, there are two or three planet gears 43 spaced evenly around the sun gear 42. If there are a plurality of planet gears 43, then they are all joined by a planetary carrier 45 that rigidly fixes their position relative to one another while allowing each planet gear 43 to rotate about its center axis. If there is only one planet gear 43 in the planetary gear set 40, then the planetary carrier 45, which appears as a connecting arm, links the single planet gear 43 to the center axis of the planetary gear set 40 in order to hold the planet gear 43 in place while allowing it to rotate about its center axis. The planetary carrier 45 rigidly attaches to the input shaft 51 from one of the engines 50, so that the first engine 50 drives the planetary carrier 45 of planetary gear set 40.

On the other side of the open differential 20, the attachments to planetary gear set 30 and the second engine 60 are essentially the same as described above, so that the preferred embodiment of the ICEEU 10 is basically reciprocal about the open differential 20. The side bevel gear of the open differential 20 rigidly attaches to the annular gear of the planetary gear set 30, forming the annular side bevel gear 24. This gear has two faces, so that it can mesh with both the planet bevel gear 22 of the open differential 20 and the planet gears 33 of the planetary gear set 30, simultaneously serving both functions. The annular side bevel gear 24 encloses the planetary gear set 30. The internal open differential carrier 25 rigidly attaches to the sun gear 32 of the planetary gear set 40. The internal carrier 25 also rigidly attaches to the output shaft 80, which serves to provide the single motivating drive force for the vehicle, based upon the power provided by the two engines 50 and 60. Thus, output shaft 80, sun gear 32 of planetary gear set 30, the internal carrier 25 of the open differential 20, and sun gear 42 of planetary gear set 40 are unitary in the preferred embodiment.

The sun gear 32 and the annular side bevel gear 24 are both contacted (with intermeshing teeth) by one or more planet gears 33, which are located between the sun gear 32 and the annular side bevel gear 24. Typically, there are two or three planet gears 33 spaced evenly around the sun gear 32. If there are a plurality of planet gears 33, then they are all joined by a planetary carrier 35 that rigidly fixes their position relative to one another while allowing each planet gear 33 to rotate about its center axis. If there is only one planet gear 33 in the planetary gear set 30, then the planetary carrier 35, which appears as a connecting arm, links the single planet gear 33 to the center axis of the planetary gear set 30 in order to hold the planet gear 33 in place while allowing it to rotate about its center axis. The planetary carrier 35 is connected to the input shaft 61 from the second engine 60, so that the second engine 60 drives the planetary carrier 35 of planetary gear set 30. In the preferred embodiment, this attachment is accomplished using gears 67, which imparts the rotation of input shaft 61 to the planetary carrier 35 of planetary gear set 30.

The preferred embodiment also employs additional elements that improve the functioning of the ICEEU 10 as an engine efficiency unit for integrating and separating two internal combustion engines from the power train during operation of the vehicle. For instance, various types of clutching mechanisms could be employed at the points of connection between the ICEEU 10 and the two engines 50 and 60. In the preferred embodiment, input shaft 61 from the second engine 60 contains a one-way clutch, and extends out to a point where it may interact with the other planetary gear set 40. Gears 68 connect input shaft 61 to the planetary carrier 45 of planetary gear set 40. The one-way clutch 65 may interact with either the connection of input shaft 61 to planetary gear set 30 (i.e. gears 67) or the connection of input shaft 61 to planetary gear set 40 (i.e. gear 68), but in the preferred embodiment, the one-way clutch 65 is located within the gears 68. This arrangement allows input shaft 61, when it is the faster rotating input shaft, to pull input shaft 51, while also allowing input shaft 61 to free wheel if input shaft 51 outpaces it. So in the preferred embodiment, when engine 60 runs alone, a 1 to 1 ratio is established; when engine 50 runs alone, a 2 to 1 ratio is established, since planetary carrier 35 is effectively held, allowing engine 50 to basically push from the stopped engine 60. The preferred embodiment also utilizes friction clutches 53 and 63 at the point of connection between the input shafts 51 and 61 and the engines 50 and 60. This configuration allows for easy engagement and disengagement of each engine from the power train. A differential lock may also be appropriate in certain settings.

In the preferred embodiment, brakes 37, 47 are located on each of the annular side bevel gears 23, 24, providing another input mechanism that can allow the user to alter the manner in which the ICEEU 10 operates. Finally, in the preferred embodiment the two engines are configured so that the input shafts they drive rotate in opposite directions. This choice is simply a function of the location of the engines 50 and 60 relative to one another and the manner of connecting the engines 50 and 60 to the ICEEU 10 (and specifically to the planetary carriers 35 and 45 in the preferred embodiment).

The preferred embodiment of the ICEEU 10 produces an approximately 2 to 1 ratio when engine 50 is used alone (i.e when engine 60 is removed from the power train by disengaging the friction clutch 63). An approximately 1 to 1 ratio is produced by engine 60 when it is used alone. The two ratios can integrate to an approximately 1 to 1 ratio when both engines 50 and 60 are used together in situations when power is needed. When either engine enters the power train while the other engine is operating, the phase shifting ratios allow the entering engine to reach approximately ⅙ the speed of the operating engine and to enter the power train at approximately half the ratio of the planetary units. Then a continuously variable transmission function begins that causes continuous ratio changes until the engines 50 and 60 synchronize, at which point the output ratio is approximately 1 to 1. That is to say that if a stopped engine enters the power train while the other engine is operating, a continuously variable ratio is established, in which the ICEEU 10 alters the ratios until the engines synchronize to a 1 to 1 ratio once both engines are running under load. In other words, the continuously variable transmission function operates as a sort of smooth interpolation, progressively altering the ratios between each engine 30 and 40 and the output shaft 80 when an engine enters the power train from a stop until it synchronizes the engines 30 and 40 to an output ratio of 1 to 1. This continuously variable transmission effect, which is essentially the infinitely variable ratio of the base device under the constraints provided by the specific configuration of the preferred embodiment with its particular connections, allows the engines 50 and 60 to enter and leave the power train at any RPM and torque, providing a smooth transition in the interim.

The brakes 37, 47 provide an additional input into the system, which further improves the process of bringing an engine that has been stopped back up into the power train. The brakes 37, 47 improve the operation of the preferred embodiment of the ICEEU 10 by bringing the stopped engine up to idle speed before it accepts any significant load. For example, while engine 60 is running alone and engine 50 is stopped, brake 47 may be used to hold annular side bevel gear 23 of planetary gear set 40. This action causes input shaft 61 to slow to the base ratio of the planetary gear set while rotating the same direction as the output shaft 80 at the fixed ratio of the planetary gear set, and allows stopped engine 50 to come up to idle speed before it has to accept any significant load. A similar process could be employed, using brake 37, if engine 60 were stopped and needed to be brought into the power train while engine 50 was running alone. Essentially, the ICEEU 10 utilizes a reduction ratio effect to jump start the stopped engine.

The brakes 37 and 47 may also be used for another optional purpose if one or more flywheels are present in the ICEEU 10 system to store rotational energy. In that case, if engine 60 is running alone and engine 50 is stopped, brake 37 may be used to hold annular side bevel gear 24 of planetary gear set 30. This action causes an overdrive effect which can be used to accelerate a flywheel to store kinetic energy. Similarly, if engine 60 were stopped and engine 50 were running alone, brake 47 could be used to accelerate a flywheel. This braking process does not improve the basic functioning of the ICEEU 10 as a device for improving fuel efficiency in vehicles by bringing engines in and out of the power train seamlessly as needed; it is merely an optional effect, providing additional usage for the brakes 37 and 47.

The specific embodiments and uses described in detail above are merely illustrative examples of the preferred embodiment of the ICEEU 10 invention and are not intended to limit the present invention. A person skilled in the art field will understand and appreciate additional embodiments and uses, which are also included within the scope of the present invention. They will also understand and appreciate that equivalents exist for many of the elements of the ICEEU 10 invention, and all such equivalents are also included within the scope of this invention. For instance, different engine configurations are possible for convenience in vehicle design. Both ICEs could be located in front of the ICEEU 10 or the direction of rotation of the input shafts 51, 61 could be altered, and although the basic features of the invention would remain the same, the manner of connection between the engine 60 and the planetary carrier 35 might need to be altered to address the location and rotation of the engines. Such means for connecting the engines 50 and 60 to the planetary carriers 35 and 45 would include sprockets and chains, gears, and any other equivalents. The specific clutching mechanisms discussed in the preferred embodiment are also illustrative, and equivalents are included herein as well. Furthermore, although the preferred embodiment of the ICEEU 10 employs planetary gear sets with single planet gears, double planet gears could also be used (if, for example, there was a need to reverse the direction of rotation from the input shafts 51 and 61).

In the preferred embodiment, the two internal combustion engines 50 and 60 may range in size depending upon the vehicle's specific needs; the engines 50 and 60 may be identical (with the same horsepower, number of cylinders, bore size, stroke length, etc.), but one engine may also be up to twice as large (in terms of horsepower) as the other in the preferred embodiment. The ICEEU 10 can effectively integrate two ICEs with different characteristics, and can even integrate an internal combustion engine with a different sort of motor. The size of each gear and the selection of the appropriate planetary gear set ratio will depend upon the specific circumstances the vehicle will encounter, and must be customized depending on the constraints provided by the vehicle at issue (for example the size of the drive shaft and the power provided by each of the two engines). The ICEEU 10 is an extremely versatile device, and by changing these design considerations, it can be used in many different situations. Indeed, in certain configurations, the two planetary gear sets 30 and 40 of the ICEEU 10 might not even match, so that the gears in one planetary gear set would be a different size than the gears in the other planetary gear set (although this would only be useful in unusual situations and would tend to increase wear issues). The scope of the invention is more fully defined in the following claims, and the only limits to the scope of the invention are those set forth within the claims below.

We claim:

1. An engine efficiency unit comprising:
   an open differential; and
   two planetary gear sets;
   wherein said open differential comprises:
      a carrier,
      one or more planet gears, and
      two output gears;
   wherein each of said two planetary gear sets comprises:
      a sun gear,
      an annular gear, and
      a planetary gear array;
   wherein said annular gear of said first planetary gear set is rigidly attached to one of said output gears of said open differential, and said annular gear of said second planetary gear set is rigidly attached to remaining of said output gears of said open differential; and
   wherein said open differential carrier is rigidly attached to both said sun gear of said first planetary gear set and said sun gear of said second planetary gear set.

2. An engine efficiency unit as in claim 1 wherein said first planetary gear set is identical to said second planetary gear set.

3. An engine efficiency unit as in claim 1 further comprising:
   two input shafts; and
   an output shaft;
   wherein said first input shaft is connected to said planetary array of said first planetary gear set, said second input shaft is connected to said planetary array of said second planetary gear set, and said output shaft is rigidly attached to said open differential carrier.

4. An engine efficiency unit as in claim 1 further comprising one or more brakes.

5. An engine efficiency unit as in claim 3 further comprising one or more brakes.

6. An engine efficiency unit as in claim 5 wherein one of said input shafts further comprises a one-way clutch.

7. An engine efficiency unit as in claim 3 wherein said second input shaft further comprises a one-way clutch, and wherein said second input shaft also connects to said planetary array of said first planetary gear set.

8. An engine efficiency unit as in claim 7 further comprising:
   two engines;
   wherein each of said planetary arrays for said first and said second planetary gear sets further comprises one or more planet gears and a planetary carrier;
   said first input shaft is connected to said planetary carrier of said first planetary gear set, and connects to said first engine; and
   said second input shaft is connected to said planetary carrier of said second planetary gear set and to said planetary carrier of said first planetary gear set, and connects to said second engine.

9. An engine efficiency unit as in claim 8 wherein:
   said sun gear of said first planetary gear set and said sun gear of said second planetary gear set are substantially the same size and have substantially the same number of teeth;
   said annular gear of said first planetary gear set and said annular gear of said second planetary gear set are substantially the same size and have substantially the same number of teeth; and
   said one or more planet gears of said first planetary gear set and said one or more planet gears of said second planetary gear set are substantially the same size and have substantially the same number of teeth.

10. An engine efficiency unit as in claim 8 further comprising two means for connecting parallel rotating systems; wherein said first input shaft is rigidly attached to said planetary carrier of said first planetary gear set; and said second input shaft connects to said planetary carrier of said second planetary gear set using said first means for connecting and connects to said planetary carrier of said first planetary gear set using said second means for connecting.

11. An engine efficiency unit as in claim 8 further comprising one or more brakes.

12. An engine efficiency unit as in claim 10 wherein said means for connecting each comprises gears.

13. An engine efficiency unit as in claim 10 wherein said means for connecting each comprises a chain and two sprockets.

14. An engine efficiency unit as in claim 10 wherein said one-way clutch is located on said second input shaft at the point of attachment to said first planetary gear set using said second means of connecting.

15. An engine efficiency unit as in claim 12 wherein said one-way clutch is located on said second input shaft at the point of attachment to said first planetary gear set using said second means of connecting.

16. An engine efficiency unit as in claim 10 further comprising two friction clutches; wherein said first friction clutch is located at the point of attachment of said first input shaft to said first engine, and said second friction clutch is located at the point of attachment of said second input shaft to said second engine.

17. An engine efficiency unit as in claim 12 further comprising two friction clutches; wherein said first friction clutch is located at the point of attachment of said first input shaft to said first engine, and said second friction clutch is located at the point of attachment of said second input shaft to said second engine.

18. An engine efficiency unit as in claim 17 wherein:
said sun gear of said first planetary gear set and said sun gear of said second planetary gear set are substantially the same size and have substantially the same number of teeth;
said annular gear of said first planetary gear set and said annular gear of said second planetary gear set are substantially the same size and have substantially the same number of teeth; and
said one or more planet gears of said first planetary gear set and said one or more planet gears of said second planetary gear set are substantially the same size and have substantially the same number of teeth.

19. An engine efficiency unit as in claim 1 wherein said open differential carrier is an internal carrier.

20. An engine efficiency unit as in claim 8 wherein said open differential carrier is an internal carrier.

21. An engine efficiency unit comprising:
an open differential; and
two planetary gear sets;
wherein said open differential comprises:
an internal carrier,
one or more planet bevel gears, and
two side bevel gears;
wherein each of said two planetary gear sets comprises:
a sun gear,
an annular gear, and
a planetary gear array;
wherein said annular gear of said first planetary gear set is rigidly attached to one of said side bevel gears of said open differential, and said annular gear of said second planetary gear set is rigidly attached to remaining of said side bevel gears of said open differential; and
wherein said open differential carrier is rigidly attached to both said sun gear of said first planetary gear set and said sun gear of said second planetary gear set.

22. An engine efficiency unit as in claim 21 further comprising:
two input shafts; and
an output shaft;
wherein said first input shaft is connected to said planetary array of said first planetary gear set, said second input shaft is connected to said planetary array of said second planetary gear set, and said output shaft is rigidly attached to said open differential internal carrier.

23. An engine efficiency unit as in claim 22 wherein the rigid attachment of said annular gear in said first planetary gear set to one of said side bevel gears of said open differential forms a single, unitary gear element with two gear faces; the rigid attachment of said annular gear in said second planetary gear set to remaining of said side bevel gears of said open differential forms another single, unitary gear element with two gear faces; and the rigid attachment of said output shaft, said sun gear of said second planetary gear set, said internal carrier of said open differential, and said sun gear of said first planetary gear set forms a single, unitary rotational element.

24. An engine efficiency unit as in claim 21 wherein said first planetary gear set is identical to said second planetary gear set.

25. An engine efficiency unit as in claim 21 further comprising one or more brakes.

26. An engine efficiency unit as in claim 22 further comprising two brakes, wherein one of said brakes acts upon said annular gear of said first planetary gear set, and remaining of said brakes acts upon said annular gear of said second planetary gear set.

27. An engine efficiency unit as in claim 22 wherein said second input shaft further comprises a one-way clutch, and wherein said second input shaft also connects to said planetary array of said first planetary gear set.

28. An engine efficiency unit as in claim 27 further comprising:
two engines;
wherein each of said planetary arrays for said first and said second planetary gear sets further comprises one or more planet gears and a planetary carrier;
said first input shaft is connected to said planetary carrier of said first planetary gear set, and connects to said first engine; and
said second input shaft is connected to said planetary carrier of said second planetary gear set and to said planetary carrier of said first planetary gear set, and connects to said second engine.

29. An engine efficiency unit as in claim 28 wherein:
said sun gear of said first planetary gear set and said sun gear of said second planetary gear set are substantially the same size and have substantially the same number of teeth;
said annular gear of said first planetary gear set and said annular gear of said second planetary gear set are substantially the same size and have substantially the same number of teeth; and
said one or more planet gears of said first planetary gear set and said one or more planet gears of said second planetary gear set are substantially the same size and have substantially the same number of teeth.

30. An engine efficiency unit as in claim 28 further comprising two means for connecting parallel rotating systems; wherein said first input shaft is rigidly attached to said planetary carrier of said first planetary gear set; and said second input shaft connects to said planetary carrier of said second planetary gear set using said first means for connecting and connects to said planetary carrier of said first planetary gear set using said second means for connecting.

31. An engine efficiency unit as in claim 28 further comprising two brakes, wherein one of said brakes acts upon said annular gear of said first planetary gear set, and remaining of said brakes acts upon said annular gear of said second planetary gear set.

32. An engine efficiency unit as in claim 29 further comprising two brakes, wherein one of said brakes acts upon said annular gear of said first planetary gear set, and remaining of said brakes acts upon said annular gear of said second planetary gear set.

33. An engine efficiency unit as in claim 30 wherein said means for connecting each comprises gears.

34. An engine efficiency unit as in claim 30 wherein said means for connecting each comprises a chain and two sprockets.

35. An engine efficiency unit as in claim 30 wherein said one-way clutch is located on said second input shaft at the point of attachment to said first planetary gear set using said second means of connecting.

36. An engine efficiency unit as in claim 33 wherein said one-way clutch is located on said second input shaft at the point of attachment to said first planetary gear set using said gears.

37. An engine efficiency unit as in claim 30 further comprising two friction clutches; wherein said first friction clutch is located at the point of attachment of said first input shaft to said first engine, and said second friction clutch is located at the point of attachment of said second input shaft to said second engine.

38. An engine efficiency unit as in claim 33 further comprising two friction clutches; wherein said first friction clutch is located at the point of attachment of said first input shaft to said first engine, and said second friction clutch is located at the point of attachment of said second input shaft to said second engine.

39. An engine efficiency unit as in claim 38 wherein:
   said sun gear of said first planetary gear set and said sun gear of said second planetary gear set are substantially the same size and have substantially the same number of teeth;
   said annular gear of said first planetary gear set and said annular gear of said second planetary gear set are substantially the same size and have substantially the same number of teeth; and
   said one or more planet gears of said first planetary gear set and said one or more planet gears of said second planetary gear set are substantially the same size and have substantially the same number of teeth.

40. An engine efficiency unit as in claim 31 further comprising a flywheel.

41. An engine efficiency unit as in claim 27 wherein each of said planetary arrays for said first and said second planetary gear sets further comprises a plurality of planet gears and a planetary carrier, and wherein a double planet gear arrangement is used for at least one of said planetary gear sets.

* * * * *